UNITED STATES PATENT OFFICE.

MARTIN HERZBERG, OF LEVERKUSEN, NEAR COLOGNE, GERMANY, ASSIGNOR TO SYNTHETIC PATENTS CO., INC., OF NEW YORK, N. Y., A CORPORATION OF NEW YORK.

AZO DYESTUFFS.

1,126,466. Specification of Letters Patent. Patented Jan. 26, 1915.

No Drawing. Application filed February 25, 1914. Serial No. 820,875.

*To all whom it may concern:*

Be it known that I, MARTIN HERZBERG, doctor of philosophy, chemist, citizen of the German Empire, residing at Leverkusen, near Cologne-on-the-Rhine, Germany, have invented new and useful Improvements in Azo Dyestuffs, of which the following is a specification.

I have found that new and valuable azo dyestuffs can be obtained by combining the tetrazo compounds of diaminodiphenylureas

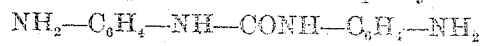

with one molecule of an aminonaphthol sulfonic acid compound and with one molecule of resorcin, the order of combination being immaterial. The new products are after being dried and pulverized in the shape of their alkaline salts dark powders soluble in water generally with a brownish coloration. They dye cotton in generally from red to brown shades. The shades produced with these colors are rendered very fast to washing and to light by an aftertreatment with formaldehyde. Upon treatment with stannous chlorid and hydrochloric acid they are split up into a diaminodiphenylurea, a diaminonaphthol sulfonic acid compound and an aminoresorcin.

In order to illustrate the new process more fully the following example is given, the parts being by weight:—24.2 parts of para-para-diaminodiphenylurea are diazotized with 60 parts of hydrochloric acid and 14 parts of sodium nitrite. The diazo compound is then rendered distinctly alkaline with soda and an alkaline solution of 23.9 parts of 2-amino-8-naphthol-6-sulfonic acid is added to it. The intermediate compound separates. 11 parts of resorcin are added to it, while it is being stirred, the mixture is heated and the azo dye is finally salted out. It is a dark powder soluble in water and in concentrated sulfuric acid with a brownish coloration and dyeing cotton in reddish-brown shades, which are rendered fast to washing and to light by an aftertreatment with formaldehyde; and yielding upon treatment with stannous chlorid and hydrochloric acid para-para-diaminodiphenylurea, amino-resorcin and 2.7-diamino-8-naphthol-6-sulfonic acid. The new dye has in a free state most probably the formula:

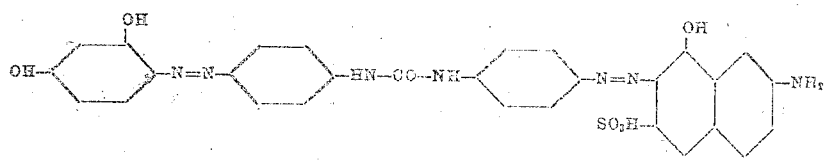

Other aminonaphthol-sulfonic acid compounds can be used, such as 2.5.7-aminonaphthol sulfonic acid, 2-amino-benzoyl-amino-8-naphthol-6-sulfonic acid, 2-acetyl-amino-8-naphthol-6-sulfonic acid, aminophenyl-8-oxynaphthothiazole-6-sulfonic acid, 1.8-aminonaphthol-4-sulfonic acid, meta-aminobenzoyl-2-amino-5-naphthol-7-sulfonic acid, meta- or para-aminophenyl-1.2-naphthimidazole-5-oxy-7-sulfonic acid, etc. Instead of para-para-diaminodiphenylurea, the meta-meta-diaminodiphenylurea can be used.

The dyestuff obtained e. g. by the combination of diazotized meta-meta-diamodiphenylurea with meta-amino-phenyl-1.2-naphthimidazole-5-oxy-7-sulfonic acid and resorcin dyes cotton in pure bluish-red shades fast to washing after having been treated with formaldehyde.

I claim:—

1. The new azo dyestuffs which are after being dried and pulverized in the shape of their alkaline salts dark powders soluble in water generally with a brownish coloration, yielding upon reduction with stannous chlorid and hydrochloric acid a diaminodiphenylurea, a diaminonaphthol sulfonic acid compound and aminoresorcin; dyeing cotton generally in red to brown shades which are rendered fast to washing and to light by an aftertreatment with formaldehyde; substantially as described.

2. The new azo dyestuffs which are after being dried and pulverized in the shape of their alkaline salts dark powders soluble in water generally with a brownish coloration, yielding upon reduction with stannous chlorid and hydrochloric acid a para-para-diaminodiphenylurea, a diaminonaphthol sulfonic acid compound and aminoresorcin; dyeing cotton generally in red to brown shades which are rendered fast to washing and to light by an after treatment with formaldehyde, substantially as described.

3. The new azo dyestuffs which are after being dried and pulverized in the shape of their alkaline salts dark powders soluble in water generally with a brownish coloration, yielding upon reduction with stannous chlorid and hydrochloric acid a diaminodiphenylurea, a 2.7-diamino-8-naphthol-6-sulfonic acid and aminoresorcin; dyeing cotton generally in red to brown shades which are rendered fast to washing and to light by an after treatment with formaldehyde, substantially as described.

4. The new azo dyestuffs which are after being dried and pulverized in the shape of their alkaline salts dark powders soluble in water generally with a brownish coloration, yielding upon reduction with stannous chlorid and hydrochloric acid a diaminodiphenylurea, a diaminonaphthol-mono-sulfonic acid and aminoresorcin; dyeing cotton generally in red to brown shades which are rendered fast to washing and to light by an after treatment with formaldehyde, substantially as described.

5. The new azo dyestuffs which are after being dried and pulverized in the shape of their alkaline salts dark powders soluble in water generally with a brownish coloration, yielding upon reduction with stannous chlorid and hydrochloric acid para-para-diaminodiphenylurea, a diaminonaphthol-mono-sulfonic acid and aminoresorcin; dyeing cotton generally in red to brown shades which are rendered fast to washing and to light by an after treatment with formaldehyde, substantially as described.

6. The new azo dyestuff having in a free state most probably the formula:

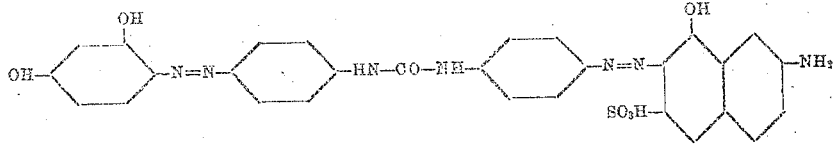

which is after being dried and pulverized a dark powder soluble in water and in concentrated sulfuric acid with a brownish coloration; yielding upon reduction with stannous chlorid and hydrochloric acid para-para-diaminodiphenylurea, aminoresorcin and 2.7-diamino-8-naphthol-6-sulfonic acid; dyeing cotton in reddish-brown shades which are rendered fast to washing and to light by an aftertreatment with formaldehyde, substantially as described.

In testimony whereof I have hereunto set my hand in the presence of two subscribing witnesses.

MARTIN HERZBERG.

Witnesses:
WILHELM NEELMEIER,
AUGUST SIGWARK.